United States Patent
DeLuca et al.

(10) Patent No.: US 9,208,259 B2
(45) Date of Patent: Dec. 8, 2015

(54) USING SYMBOLS TO SEARCH LOCAL AND REMOTE DATA STORES

(75) Inventors: Lisa Seacat DeLuca, San Francisco, CA (US); Lydia M. Do, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1358 days.

(21) Appl. No.: 12/629,453

(22) Filed: Dec. 2, 2009

(65) Prior Publication Data

US 2011/0131233 A1 Jun. 2, 2011

(51) Int. Cl.
*G06F 7/00* (2006.01)
*G06F 17/30* (2006.01)

(52) U.S. Cl.
CPC ............................ *G06F 17/30967* (2013.01)

(58) Field of Classification Search
CPC .............. Y10S 707/99933; Y10S 707/99932; Y10S 707/99934; Y10S 707/99935; Y10S 707/99931; Y10S 707/99937; G06F 17/30864; G06F 17/30554; G06F 17/30893; G06F 17/30424; G06F 17/30675; G06F 17/30758; G06F 3/0237; G06F 3/048
See application file for complete search history.

(56) References Cited

U.S. PATENT DOCUMENTS

| | | | | |
|---|---|---|---|---|
| 4,748,439 A * | 5/1988 | Robinson et al. | ........... | 340/146.2 |
| 4,774,655 A * | 9/1988 | Kollin et al. | ............................ | 1/1 |
| 5,187,480 A * | 2/1993 | Thomas et al. | .................. | 341/22 |
| 6,131,092 A * | 10/2000 | Masand | ................. | 1/1 |
| 6,175,830 B1 * | 1/2001 | Maynard | ................. | 1/1 |
| 6,564,254 B1 * | 5/2003 | Shoji et al. | ..................... | 709/217 |
| 6,850,906 B1 * | 2/2005 | Chadha et al. | ............... | 705/36 R |
| 7,024,664 B2 | 4/2006 | Beckmann | ..................... | 717/136 |
| 7,376,661 B2 | 5/2008 | Larson | ......................... | 707/101 |
| 7,386,599 B1 * | 6/2008 | Piersol et al. | .................. | 709/217 |
| 7,440,947 B2 | 10/2008 | Adcock et al. | ..................... | 707/7 |
| 2002/0138479 A1 * | 9/2002 | Bates et al. | ........................ | 707/5 |
| 2004/0203416 A1 * | 10/2004 | Hata et al. | ..................... | 455/67.7 |
| 2005/0003868 A1 | 1/2005 | Oh | ................................. | 455/566 |
| 2005/0027666 A1 | 2/2005 | Beck, Jr. et al. | .................. | 707/1 |
| 2005/0041886 A1 * | 2/2005 | Wada | ............................ | 382/305 |
| 2005/0080776 A1 | 4/2005 | Colledge et al. | .................. | 707/3 |
| 2005/0144152 A1 | 6/2005 | Punaganti et al. | ................ | 707/1 |
| 2005/0181777 A1 | 8/2005 | Kim | ................................ | 455/418 |
| 2005/0192944 A1 * | 9/2005 | Flinchem | ......................... | 707/3 |
| 2005/0278175 A1 | 12/2005 | Hyvonen | ..................... | 704/242 |
| 2006/0031207 A1 | 2/2006 | Bjarnestam et al. | .............. | 707/3 |
| 2006/0123048 A1 | 6/2006 | Larson | ......................... | 707/103 |
| 2006/0129691 A1 * | 6/2006 | Coffee et al. | .................. | 709/230 |
| 2006/0167678 A1 | 7/2006 | Ford | ................................. | 704/9 |
| 2007/0156404 A1 | 7/2007 | Lee et al. | ....................... | 704/254 |
| 2007/0157180 A1 | 7/2007 | Tillmann et al. | .............. | 717/140 |
| 2007/0276918 A1 | 11/2007 | Alderson | ..................... | 709/217 |
| 2007/0277164 A1 | 11/2007 | Nandakumaraiah | ........... | 717/143 |
| 2008/0208820 A1 | 8/2008 | Usey et al. | ........................ | 707/3 |
| 2008/0219989 A1 * | 9/2008 | Fanger et al. | ............... | 424/139.1 |
| 2008/0313564 A1 * | 12/2008 | Barve et al. | ..................... | 715/816 |
| 2009/0077047 A1 | 3/2009 | Cooper et al. | ..................... | 707/4 |
| 2009/0089044 A1 | 4/2009 | Cooper et al. | ..................... | 704/9 |

* cited by examiner

*Primary Examiner* — Augustine K Obisesan
(74) *Attorney, Agent, or Firm* — VanLeeuwen & VanLeeuwen; Joseph C. Polimeni (57) ABSTRACT

An approach is provided that uses symbols to represent search criteria. In this approach, a symbol is received from a user in a search request. Search criteria that corresponds to the received symbol is retrieved from a computer accessible data store. Data stores are searched for the plurality of search criteria that correspond with the received symbol and search results are retrieved based on the searching performed. These retrieved search results are then provided to the user.

11 Claims, 6 Drawing Sheets

USING SYMBOLS TO SEARCH LOCAL AND REMOTE DATA STORES

BACKGROUND OF THE INVENTION

1. Technical Field

The present invention relates to an approach for searching both local and remote data stores using symbols that correspond to search criteria.

2. Description of the Related Art

Information users, such as governmental organizations, corporations, and other private organizations, typically search data sources. Some of these sources may be maintained in-house, while others may be maintained, and therefore controlled, by external entities, and are accessed over a computer network, such as the Internet. Searching these data sources (data stores) often involves entering search terms, or "search criteria", in a way that can be understood by the search engines. These searches often involve entering strings of text that the user is interested in finding. Entering text strings can introduce user error if the user enters the strings incorrectly. These searches can also involve entering logical search terms that relate the text strings to one another, such as the logical search terms of AND, OR, and NOT.

SUMMARY

An approach is provided that uses symbols to represent search criteria. In this approach, a symbol is received from a user in a search request. Search criteria that correspond to the received symbol is retrieved from a computer accessible data store. Data stores are searched for the plurality of search criteria that correspond with the received symbol and search results are retrieved based on the searching performed. These retrieved search results are then provided to the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
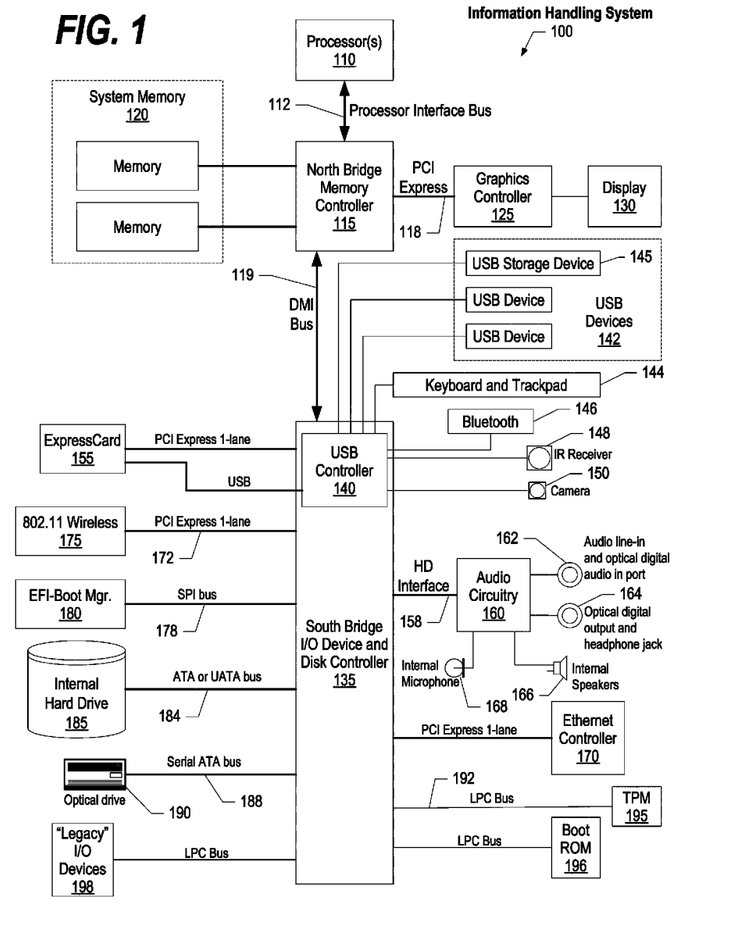
FIG. 1 is a block diagram of a data processing system in which the methods described herein can be implemented.
Figure 2:
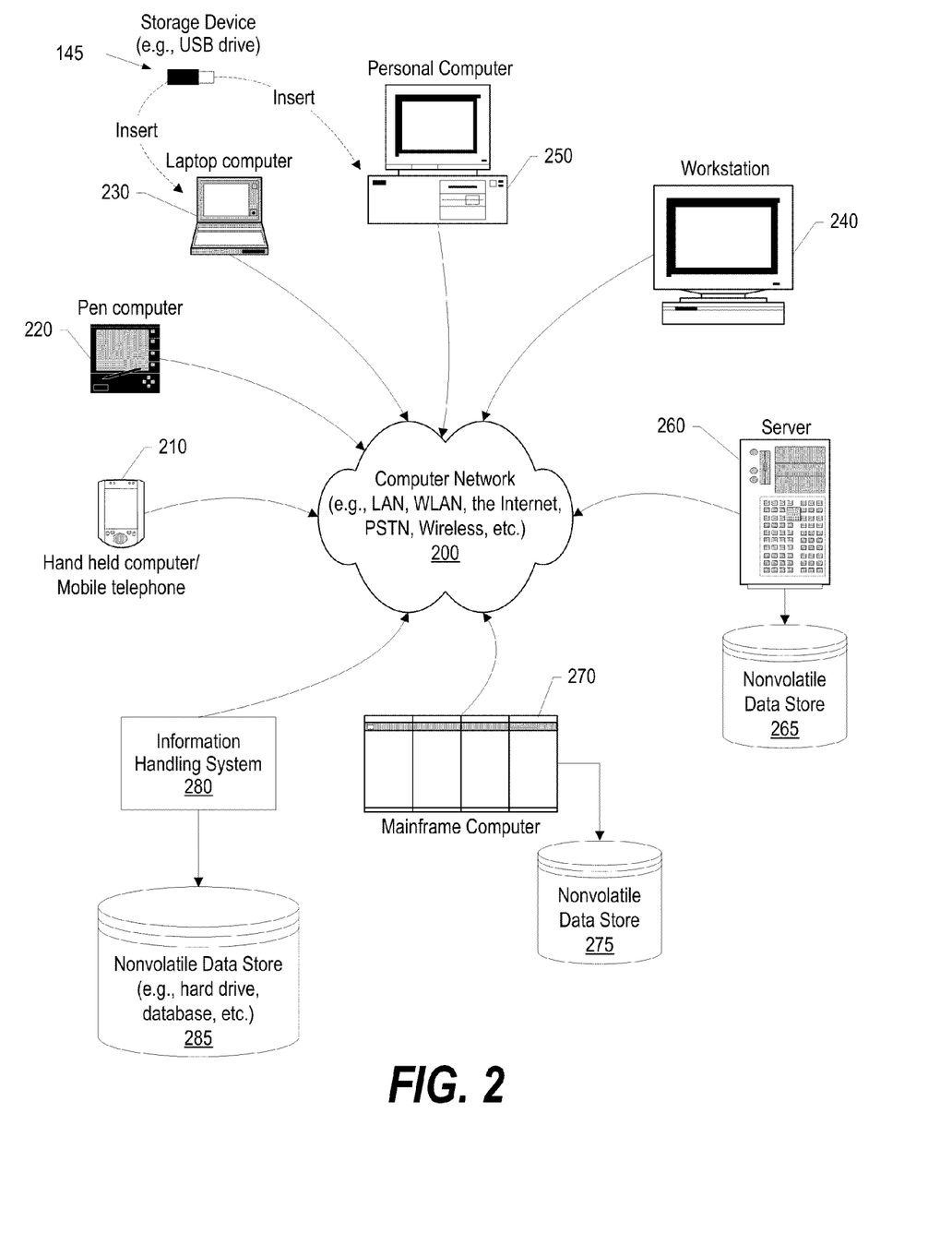
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
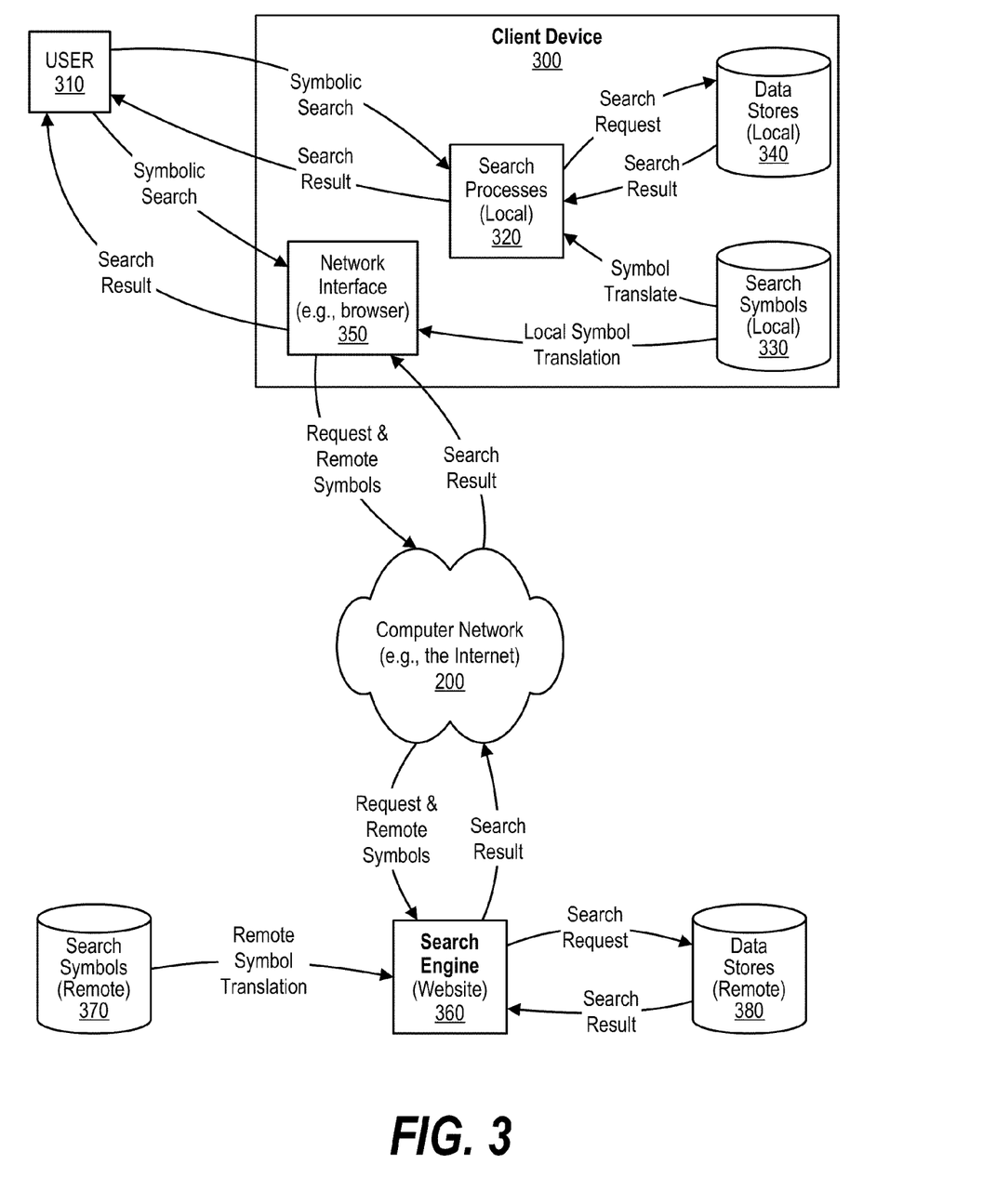
FIG. 3 is a network diagram showing interaction between a local computer system and a remote computer system to perform symbolic searching.

FIG. 3 is a network diagram showing interaction between a local computer system and a remote computer system to perform symbolic searching. Client device 300 is referred to as an information handling system as well as a local computer system. Client device 300 can be any number of processor-driven devices that are directly used by a user, such as devices 210, 220, 230, 240, 250, 260, and 270 shown in FIG. 2. Returning to FIG. 3, user 310 of client device 300 submits symbolic search requests that can be handled both locally by the client device as well as remotely handled by a remote computer system. Process 320 depicts local search processes that receive symbolic search requests from user 310, translate the received symbols to search criteria using symbols data store 330, use the search criteria to search local data stores 340, and return search results to user 310. For example, if client device 300 is used to store music files in data stores 340 and the user wishes to search for a favorite artist, such as Phil Collins, a symbol could be established by the user to search for both Phil Collins and the music band the Genesis of which he was a member. If the user established a symbol, either graphical or text, such as "\collins" to correspond with searches of "Phil Collins," and "Genesis", then both of these search criteria would be used when the user entered the search symbol "\collins." These symbols can be any graphical or textual symbols including symbols, such as barcodes, that can be scanned by a scanning device.

The symbolic searching described above is further extended to remote computer systems and remote data stores. Here, the symbolic search is sent through network interface 350 through computer network 200, such as the Internet, to remote computer system 360, such as a search engine programmed to understand symbolic searching. In one embodiment, local translations, such as described above for searches pertaining to Phil Collins, are preformed at client device 300 and these local search criteria are provided to remote computer system 360 along with the symbols entered by the user. Remote computer system 360 performs a remote symbol translation using remote symbols data store 370 and adds these additional search criteria to those provided from the local computer system. For example, remote data store 370 may also translate the \collins symbol to "The Phil Collins Big Band" of which Phil Collins was also a member. Remote computer system 360 gathers the local and remote search criteria and uses these search criteria to search one or more data stores 380 that are remote from the local computer system (the client device). The remote computer system then returns the resulting search results back to the client device where they are displayed to the user.

Figure 4:
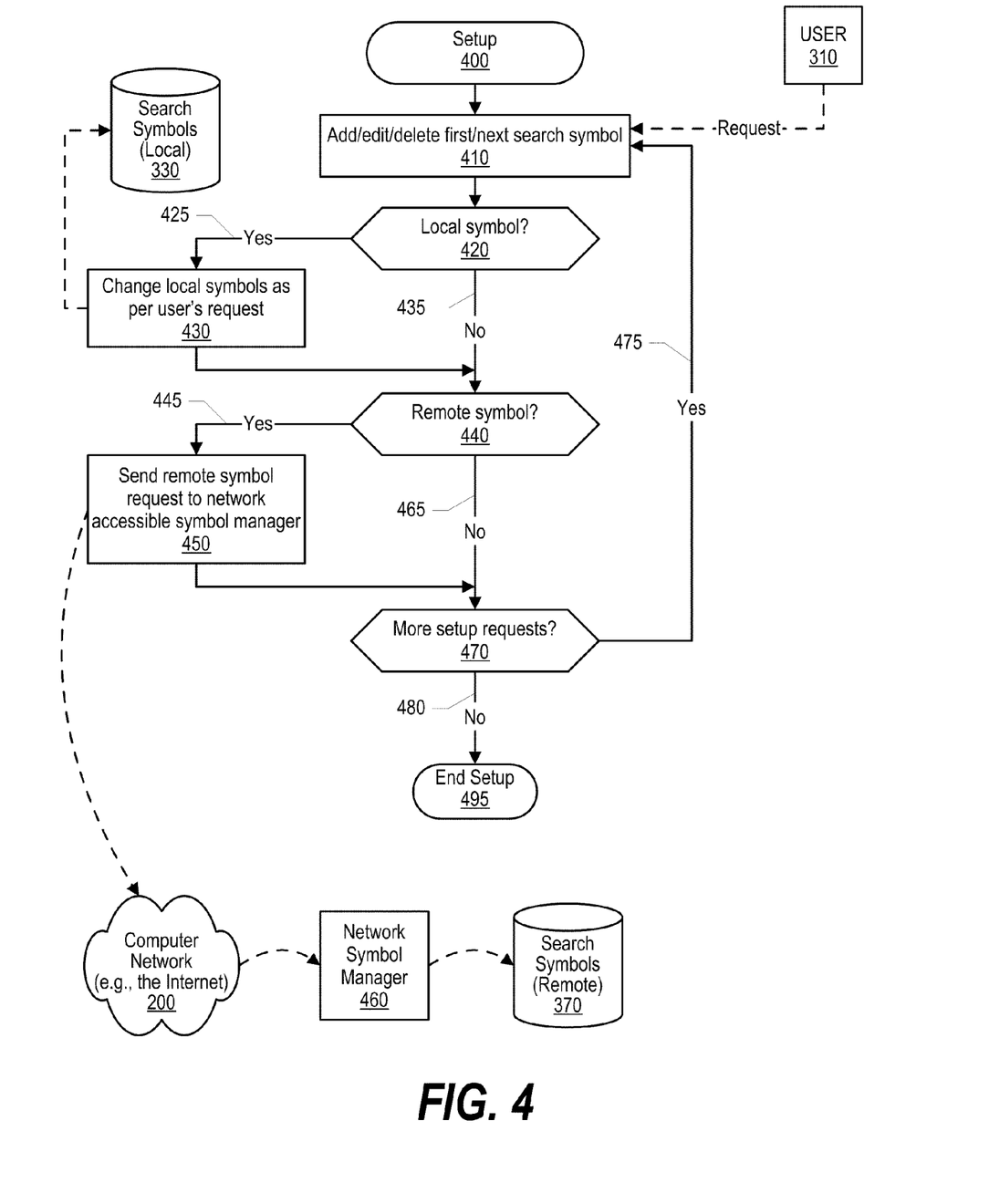
FIG. 4 is a flowchart showing setup processing.

FIG. 4 is a flowchart showing setup processing. Setup processing commences at 400 whereupon, at step 410, user 310 enters a request to add, edit, or delete a symbol. A determination is made as to whether the symbol is a local symbol (decision 420). If the symbol is a local symbol, then decision 420 branches to "yes" branch 425 whereupon, at step 430, symbols data store 330 is updated accordingly with the add, edit, or deletion request.

On the other hand, if the change is not being made to the set of local symbols, then decision 420 branches to "no" branch 435 whereupon a determination is made as to whether the symbol is a remote symbol (decision 440). If the symbol is a remote symbol, then decision 440 branches to "yes" branch 445 whereupon, at step 450, the add, edit, or deletion request is sent via computer network 200 to network symbol manager 460 to update remote search symbols data store 370. In this manner, the user can add a remote search symbol, for example from the user's desktop computer system, and the symbol is available when the user is performing a search request from a different device, such as the user's mobile telephone device. On the other hand, if the change is not being made to the set of remote symbols, then decision 440 branches to "no" branch 465 bypassing step 450. Note that a single symbol can be stored as both a local and as a remote search symbol.

A determination is made as to whether the user is making more search symbol setup requests (decision 470). If the user is making more requests, then decision 470 branches to "yes" branch 475 which loops back to receive and process the next search symbol setup request from the user. This looping continues until the user does not wish to make more search symbol setup requests upon which decision 470 branches to "no" branch 480 and setup processing ends at 495.

Figure 5:
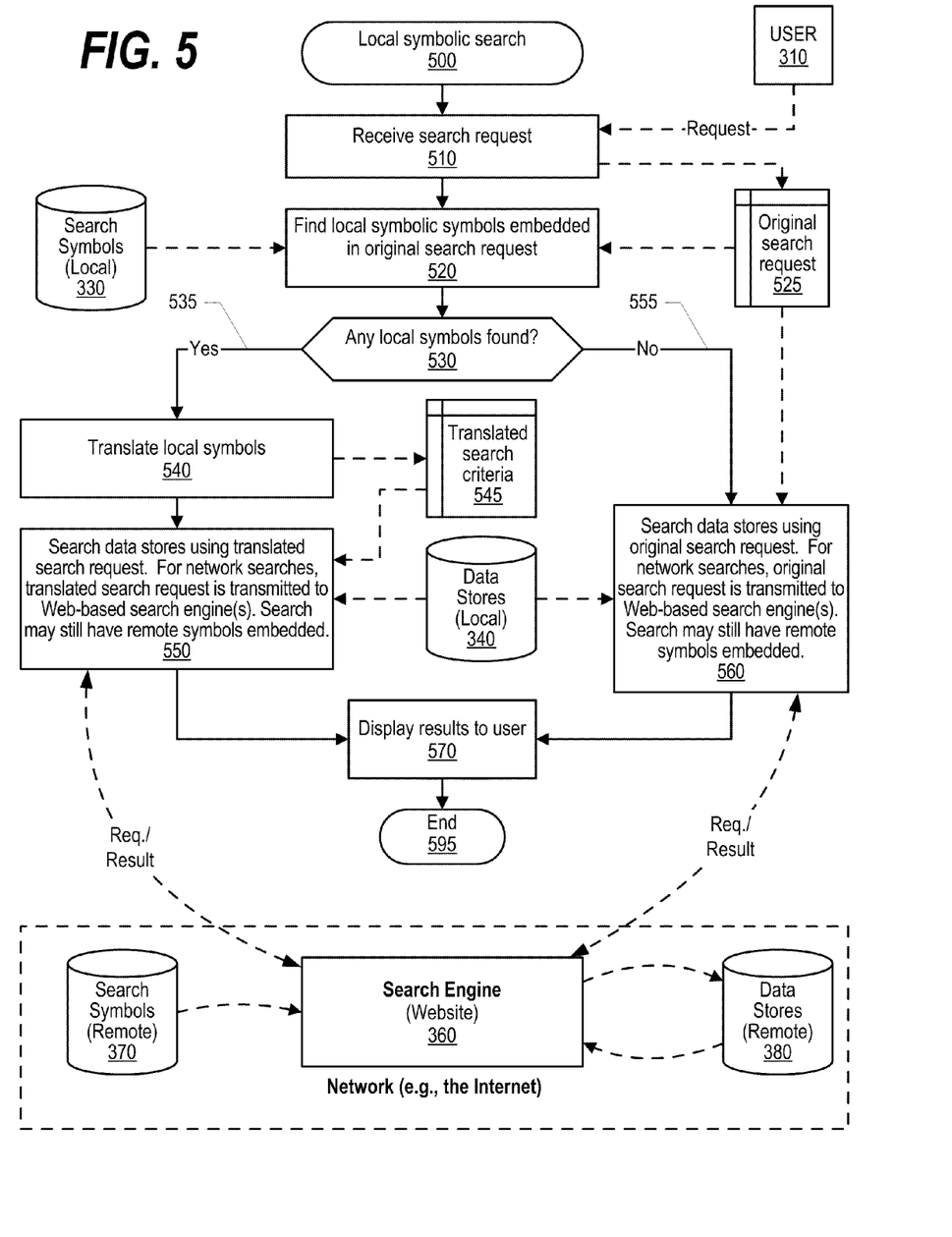
FIG. 5 is a flowchart showing steps taken to perform local symbolic searching.

FIG. 5 is a flowchart showing steps taken to perform local symbolic searching. Local symbolic search processing commences at 500 whereupon, at step 510, processing receives a symbolic search request from user 310. At step 520, the data in the search request is compared to local search symbols 330 to identify any local search symbols embedded in the search request. A determination is made as to whether any local search symbols were identified in the search request (decision 530).

If one or more local search symbols was identified in the search request, then decision 530 branches to "yes" branch 535 whereupon, at step 540, the local search symbols embedded in the search request are translated into search criteria that corresponds to the symbols as recorded in local search symbols 330. The translated search criteria are stored in memory area 545. At step 550, local data stores 340 are searched using the translated search criteria as well as any search terms provided by the user that was not a search symbol. For example, if using the Phil Collins example introduced above, if the user entered a search for \collins and "Paradise" then the search would be for Phil Collins with the word "Trick" and would likely retrieve Genesis' album entitled "A Trick of the Tail" as the \collins symbol would be translated to find both Phil Collins (solo) songs as well as Genesis (band) songs. The translated search request (e.g., after symbols translated to search criteria and without symbols included) can be sent to remote computer system 360, such as a Web server through a computer network such as the Internet. This embodiment would therefore be useful for use with remote computer systems that are both symbolic aware (e.g., able to translate symbols to search criteria) as well as remote computer systems that are symbolic unaware (e.g., traditional search engines that do not translate symbols into search criteria). As shown, the search criteria (request) is sent to remote computer system 360 and the remote computer system responds with results of the search of data stores 380. In one embodiment, some search symbols that are embedded are recognized as "remote" search symbols so that these remote search symbols are not translated locally but are instead transmitted to remote computer system 360 where they are translated using remote search symbols data store 370. At step 570, the results of the searches of the local and/or the remote data stores are displayed to the user. Local symbolic search processing thereafter ends at 595.

Returning to decision 530, if no local search symbols were found in step 520, then decision 530 branches to "no" branch 555 whereupon, at step 560, a traditional search is made of local data stores 340 using the search criteria provided by the user. In one embodiment, some search symbols that are embedded are recognized as "remote" search symbols so that these remote search symbols are not translated locally but are instead transmitted to remote computer system 360 where they are translated using remote search symbols data store 370. The search criteria (and any remote search symbols) are transmitted to remote computer system 360 where the remote computer system (e.g., a search engine Web site), performs a search and returns results to the local computer system. At step 570, the results of the searches of the local and/or the remote data stores are displayed to the user. Processing thereafter ends at 595.

Figure 6:
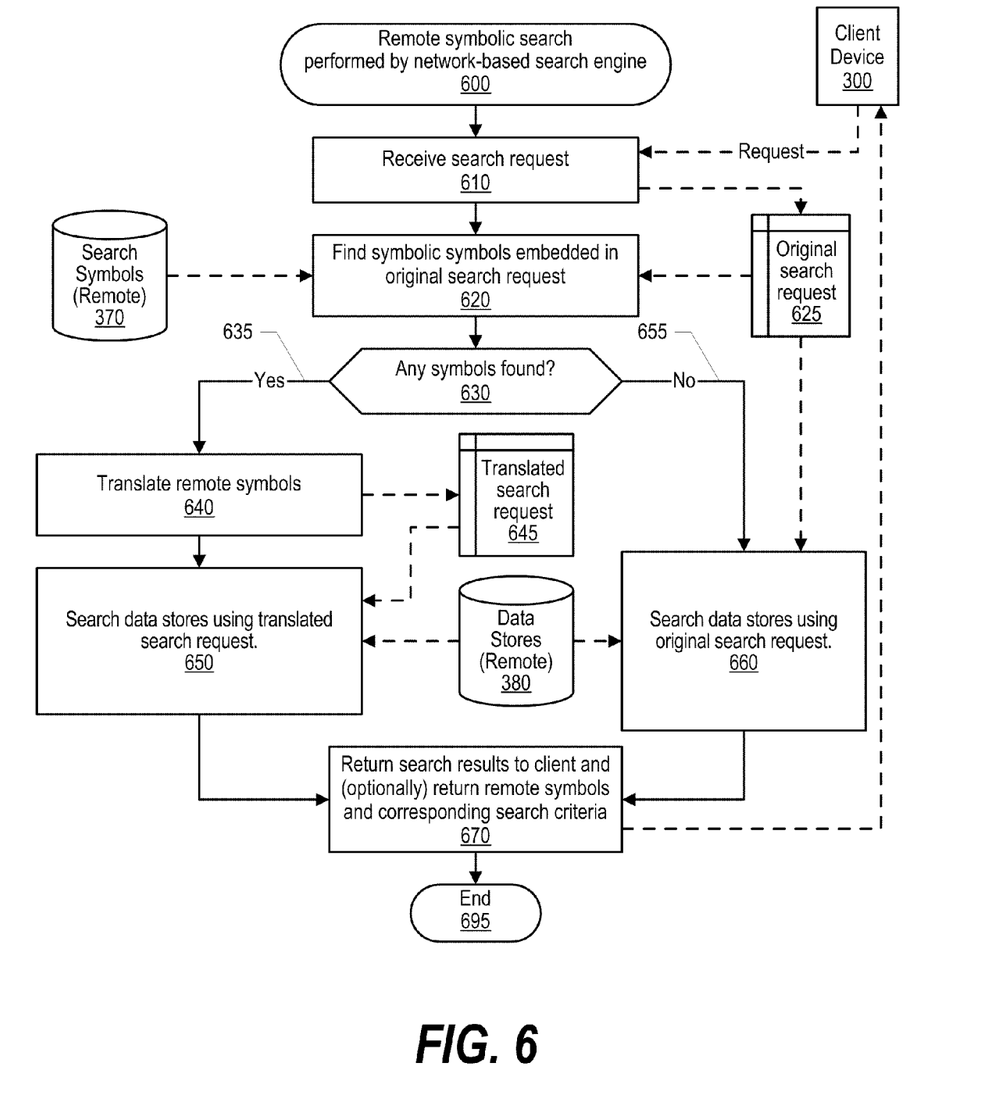
FIG. 6 is a flowchart showing steps taken to perform remote symbolic searching.

FIG. 6 is a flowchart showing steps taken to perform remote symbolic searching. Remote symbolic searching that is performed by a remote computer system, such as a search engine Web site, commences at 600 whereupon, at step 610, the remote computer system receives a search request from client device 300. At step 620, the remote computer system identifies any remote search symbols that are embedded in the received search request by comparing the received search request to search symbols stored in data store 370 with data store 370 being remote from client device 300. A determination is made as to whether any search symbols were found in the search request (decision 630).

If there were search symbols found in the search request, then decision 630 branches to "yes" branch 635 whereupon, at step 640, the remote symbols embedded in the search request are translated into search criteria that is stored in memory area 645. At step 650, a search is made (e.g., by a search engine running on the remote computer system) of data stores 380 where data stores 380 are remote from client device 300. At step 670, the results of the search operation performed by the remote computer system are returned to client device 300 so that the client device can display the search results to the user. In one embodiment, the translation of the search symbols to the search criteria is also returned to client device 300 so that the client device can update a local search symbols data store if desired. For example, using the Phil Collins search, if the remote computer system translated the \collins symbol to "'Phil Collins' OR Genesis OR 'The Phil Collins Big Band'", then this search criteria would be returned to the client device so that the client device could update the local search symbols to include this translation. Processing thereafter ends at 695.

Returning to decision 630, if the remote computer system did not identify any remote search symbols in the request from client device 300, then decision 630 branches to "no" branch 655 whereupon, at step 660, a traditional search request is made of data stores 380 using the search request provided by client device 300. Note, however, that the search request provided by client device 300 may not be the same as the search request entered by the user as the search request entered by the user may have included local search symbols that were translated into search criteria at the client device before the search request was sent to the remote computer system (see FIG. 5 and corresponding text for details regarding translation of local search symbols). At step 670, the search results gathered by the remote computer system are returned to client computer system 300. In addition, the criteria gathered by the remote computer system that corresponds to the symbol can be returned to the client device and this returned criteria can be used to update the symbol definitions, if desired by the user, locally stored in the symbol definition (data store 330) accessible from the client device. In this manner, the user's criteria can be updated as new criteria are developed by the remote computer system. For example, if Phil Collins starts a new band, the name of the new band might be part of the remote computer system's search criteria and provided to the client device so that the client's symbolic definitions can be updated with the new criteria identifying Phil Collin's new band. In addition, multiple symbols can be linked to one another in order to broaden the symbolic search. Using the Phil Collins example, a search using the Phil Collins symbol (e.g. "\Collins") might cross link to a related symbol, say for the band named "Genesis" which could, in turn, link to other related symbols, such as those corresponding to other Genesis band members. In this manner, when requested by the user, the symbolic search can be expanded to include related symbols in order to broaden the search to other symbols related to the user's entered symbol. Remote symbolic search processing thereafter ends at 695.

One of the implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving a symbol from a user in a search request;
   retrieving a first set of one or more search criteria from a local computer data store accessed by a local computer system used by the user, wherein the retrieved first set of search criteria correspond with the received symbol;
   sending the first set of one or more search criteria from the local computer system to a remote computer system along with the received symbol, wherein the local computer system and the remote computer system communicate via a computer network;
   receiving, from the remote computer system, a second set of one or more search criteria from a remote data store accessible to the remote computer system, wherein the second set of search criteria correspond with the received symbol, and one or more search results based on the remote computer system searching one or more data sources using the first and second sets of search criteria; and
   providing the received search results to the user.

2. The method of claim 1 further comprising:
   updating a symbol definition corresponding to the received symbol stored on the local computer data store, wherein the updating is based on the second set of search criteria received from the remote computer system.

3. The method of claim 1 further comprising:
   prior to receiving the search request:
      getting a plurality of symbols, including the received symbol included in the search request, from the user;
      receiving one or more search criteria corresponding to each of the plurality of symbols from the user, wherein the one or more search criteria includes the first set of search criteria corresponding to the received symbol; and
      storing each of the symbols and the one or more search criteria corresponding to each of the symbols in the local computer data store.

4. The method of claim 3 wherein the symbol is selected from a group consisting of a graphical mark and a textual string.

5. An information handling system comprising:
   one or more processors;
   a memory accessible by at least one of the processors;
   a nonvolatile storage medium accessible by at least one of the processors;
   a display device accessible by at least one of the processors;
   a network interface that connects the information handling system to a computer network, wherein the network interface is accessible by at least one of the processors; and
   a set of instructions stored in the memory and executed by at least one of the processors in order to perform actions of:
      receiving a symbol from a user in a search request;
      retrieving a first set of one or more search criteria from the nonvolatile storage medium, wherein the retrieved first set of search criteria correspond with the received symbol;
      sending, via the network interface, the first set of one or more search criteria from the information handling system to a remote computer system along with the received symbol;
      receiving, from the remote computer system, a second set of one or more search criteria from a remote data store, wherein the second set of search criteria correspond with the retrieved symbol, and one or more search results based on the remote computer system searching one or more data sources using the first and second sets of search criteria; and
      displaying the received search results to the user on the display device.

6. The information handling system of claim 5 wherein the actions further comprise:
   updating a symbol definition corresponding to the received symbol stored on the nonvolatile storage medium, wherein the updating is based on the second set of search criteria received from the remote computer system.

7. The information handling system of claim 5 wherein the actions further comprise:
   prior to receiving the search request:
      getting a plurality of symbols, including the received symbol included in the search request, from the user of the information handling system;
      receiving one or more search criteria corresponding to each of the plurality of symbols from the user, wherein the one or more search criteria includes the first set of search criteria corresponding to the received symbol; and
      storing each of the symbols and the one or more search criteria corresponding to each of the symbols in the nonvolatile storage medium.

8. A computer program product stored in a non-transitory computer readable medium, comprising functional descriptive material that, when executed by an information handling system, causes the information handling system to perform actions comprising:
   receiving a symbol from a user in a search request;
   retrieving a first set of one or more search criteria from a local computer data store accessed by a local computer system used by the user, wherein the retrieved first search criteria correspond with the received symbol;
   sending the first set of one or more search criteria from the local computer system to a remote computer system along with the received symbol, wherein the local computer system and the remote computer system communicate via a computer network;
   receiving, from the remote computer system, a second set of one or more search criteria from a remote data store accessible to the remote computer system, wherein the second set of search criteria correspond with the received symbol, and one or more search results based on the remote computer system searching one or more data sources using the first and second sets of search criteria; and
   providing the received search results to the user.

9. The computer program product of claim 8 wherein the actions further comprise:
   updating a symbol definition corresponding to the received symbol stored on the local computer data store, wherein the updating is based on the second set of search criteria.

10. The computer program product of claim 8 wherein the actions further comprise:
    prior to receiving the search request:
      getting a plurality of symbols, including the received symbol included in the search request, from the user;
      receiving one or more search criteria corresponding to each of the plurality of symbols from the user, wherein the one or more search criteria includes the first set of search criteria corresponding to the received symbol; and
      storing each of the symbols and the one or more search criteria corresponding to each of the symbols in the local computer data store.

11. The computer program product of claim 10 wherein the symbol is selected from a group consisting of a graphical mark and a textual string.

* * * * *